United States Patent [19]

Hable et al.

[11] 3,999,916
[45] Dec. 28, 1976

[54] MOUNTING PRESS MOLD CLOSURE ASSEMBLY

[75] Inventors: Allen J. Hable, Buffalo Grove; E. Daniel Albrecht, Lake Forest; James A. Nelson, Des Plaines; Richard K. Ryan, Arlington Heights, all of Ill.

[73] Assignee: Buehler Ltd., Evanston, Ill.

[22] Filed: Mar. 22, 1976

[21] Appl. No.: 669,211

[52] U.S. Cl. .............................. 425/128; 425/151; 425/251; 425/352; 425/812

[51] Int. Cl.² ...................... B29C 6/00; B29C 3/00

[58] Field of Search .......... 425/127, 128, 251, 352, 425/353, 151, 812

[56] References Cited

UNITED STATES PATENTS

| | | | |
|---|---|---|---|
| 1,831,144 | 11/1931 | Shearer | 425/128 X |
| 2,465,204 | 3/1949 | Dalton | 425/251 |
| 2,565,481 | 8/1951 | Desnoyers | 425/251 |
| 2,571,546 | 10/1951 | Desnoyers | 425/251 |
| 2,620,512 | 12/1952 | Larson | 425/251 |
| 2,963,738 | 12/1960 | Brandes et al. | 425/127 |
| 3,596,317 | 8/1971 | Nicholson | 425/128 |
| 3,682,742 | 8/1972 | Wheeler | 425/128 X |
| 3,685,935 | 8/1972 | Kurucz et al. | 425/128 X |
| 3,748,072 | 7/1973 | Whelon | 425/352 X |

Primary Examiner—J. Howard Flint, Jr.
Attorney, Agent, or Firm—Charles F. Pigott, Jr.

[57] ABSTRACT

A mold closure assembly for a mounting press for mounting metallurgical specimens in a plastic mount including a cap lockingly insertable in the upper end of the mold, a conical member disposed in a mating conical recess in the lower end of said cap, spring means for urging said conical member into such mating relation, a compression member adapted for a sliding fit in the mold and handle means attached to the cap and foldable to a non-obstructing position to permit a temperature control unit to be attached to or removed from the closure assembly.

8 Claims, 4 Drawing Figures

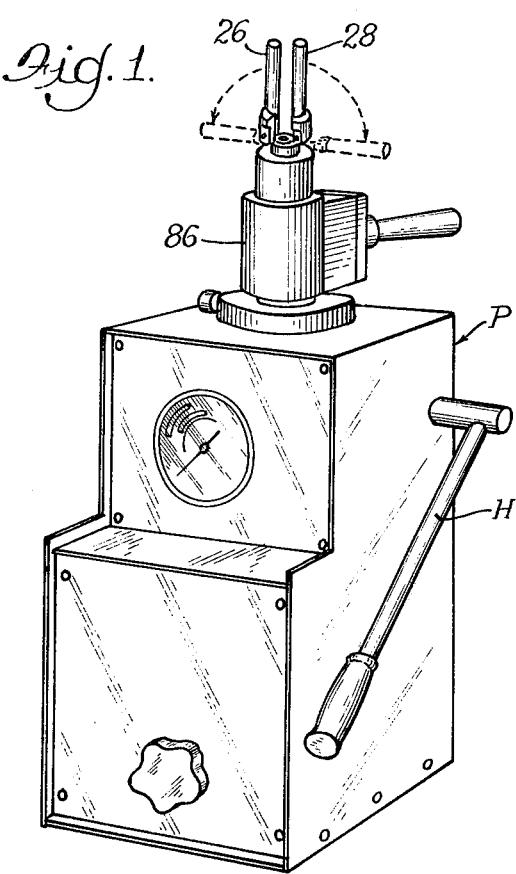
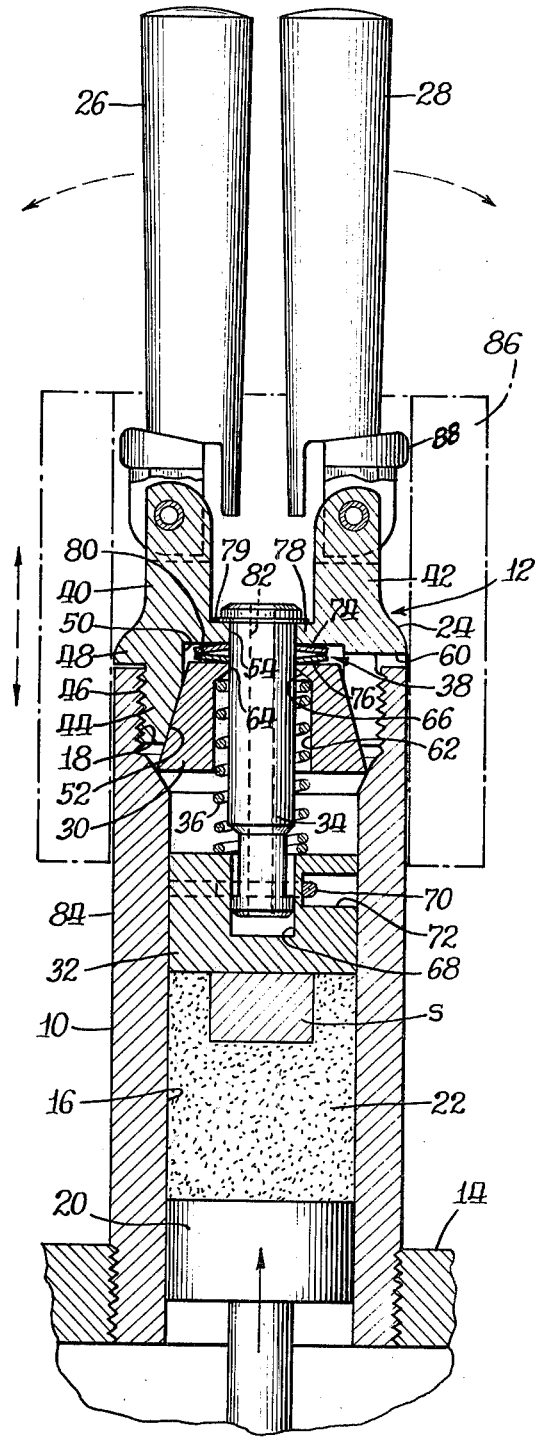
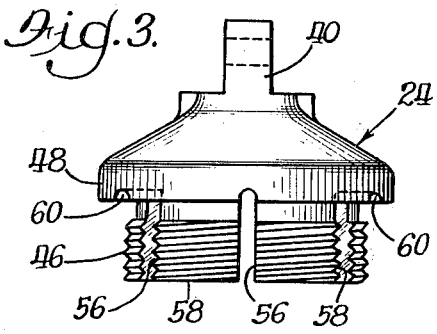
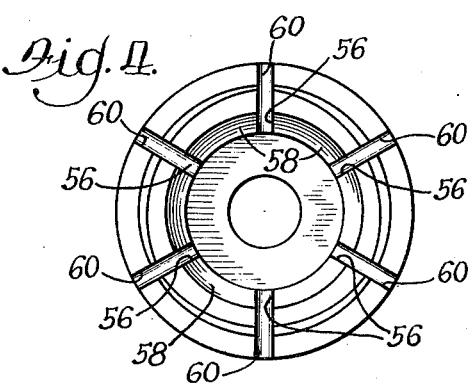

MOUNTING PRESS MOLD CLOSURE ASSEMBLY

BACKGROUND OF THE INVENTION

This invention relates to compression molding equipment and more particularly to a closure assembly for a press used for mounting metallurgical specimens in a plastic mount.

Metal specimens which are to be examined metallographically are mounted in a plastic sample or mount wherein the specimen is embedded in the plastic with one side exposed for examination. The sample is prepared by placing the specimen in a molding press, adding the plastic mounting material and curing the plastic under pressure with heat.

In the past, certain problems have been encountered with devices of this type. For example, in prior closure members which were threadedly inserted into the mold, vibration of certain portions of the press would result in the upper cap member shaking loose and because of the substantial pressure in the mold would, on occasion, become completely loosened from its threaded connection and fly up and hit the ceiling. In addition, the tight insertion of a closure member into the upper end of the mold would require the use of some independent tool, such as a wrench, to tighten the closure member or to loosen it when the molding operation was completed. These conditions required a search for some better construction to improve the closure member and molding machine as a whole.

SUMMARY OF THE INVENTION

Accordingly, it is an object of the present invention to provide a closure assembly which is reasonably tight and will not shake loose from its secured position.

Another object is to provide a convenient opening and closing means integral with the closure assembly but so constructed that it will not interfere with the attachment to or removal from the closure assembly of a temperature control unit such as a heater.

Another object of the invention is to provide in the closure assembly means for the escape of gases formed in the mold during the molding operation.

A still further object of the invention is to provide means in the closure assembly for quickly releasing the conical spreader member from the cap when the molding operation is completed.

Other objects and advantages of the invention will become more apparent when considering the following description and accompanying drawings.

BRIEF DESCRIPTION OF THE DRAWINGS

FIG. 1 is a perspective view of a mounting press utilizing a closure assembly embodying the principles of the invention herein;

FIG. 2 is a sectional view in elevation of a closure assembly embodying the invention herein;

FIG. 3 is a view in elevation of the cap used to close the upper end of the mold;

FIG. 4 is a bottom of the cap of FIG. 3.

DESCRIPTION OF PREFERRED EMBODIMENT

Referring now to the drawings wherein like reference characters are used in each of the views to represent similar parts, FIG. 1 shows a mounting press P in the upper end of which is mounted a mold cylinder. A closure assembly 12 is insertable into the upper end of the mold cylinder 10 as seen in FIG. 2.

The mounting press P may be generally of the same type as that disclosed in U.S. application for patent Ser. No. 603,102 filed on Aug. 8, 1975 and assigned to the same assignee as the invention herein.

The mold cylinder 10 is an elongated metal cylinder which is secured into the upper portion of the press P preferably by being threaded into upper wall 14 of the press P. The mold cylinder 10 has formed therein a mold cavity 16 which generally is cylindrical in form and has formed in its upper end an enlarged threaded bore 18 into which the closure assembly 12 is threadedly secured. A lower compression member or piston 20 extends into the lower end of the mold cavity and may be moved up and down by the use of pneumatic or hydraulic pressure to compress the resin 22.

The closure assembly 12 comprises a cap member 24, a pair of handles 26 and 28 attached to the cap 24, a conical member 30, an upper compression member 32, an elongated stem 34, a compression spring 36 and belleville spring means 38.

The cap member has a pair of diametrically opposed lugs 40 and 42 formed on the upper side thereof for pivotally attaching handles 26 and 28 respectively thereto. The lower portion of the cap member 24 has a skirt 44 formed thereon, the outside of the skirt being threaded at 46 to fit into the threaded bore 18 of the mold cylinder. The thread preferably is a triple lead thread which facilitates insertion of the closure assembly into the mold cylinder. A circumferentially extending shoulder 48 on the cap seats on the outer end of the mold cylinder when the cap is screwed firmly in place.

The lower end of the cap member 24 is formed with a central bore 50, the outer end of which is tapered at 52 for matingly receiving conical member 30. A smaller central bore 54 in the cap receives the stem 34 therethrough.

A plurality of circumferentially equally spaced slots 56, preferably six in number, are formed in the skirt 44 extending the full length thereof to define a plurality of segments 58 therebetween. The slots 56 communicate with grooves 60 formed in shoulder 48. The slots 56 are effective to permit slight outward expansion of the segments 58 with the build-up of pressure in the mold cylinder, thereby assuring an extremely tight fit of the cap member in the mold cylinder and eliminating the possibility of the cap becoming loosened during the molding operation due to vibration in the unit.

The conical member 30 is generally shaped as a truncated cone portion the outside of which is designed to mate with the tapered bore portion 52 in the cap. A central recess 62 and central opening 64 are formed in the conical member 30 through which the stem 34 extends. The central recess 62 is large enough to accommodate one end of compression spring 36 which surrounds stem 34. The upper end of spring 36 being seated against shoulder 66 and the lower end thereof being seated against the upper surface of upper compression member 32.

The cylindrical upper compression member 32 is designed to have a close sliding fit with the cylindrical wall of the mold cavity 16. The compression member 32 is formed with a central recess 68 into which the lower end of stem 34 is anchored by an anchoring member 70 fitted into the member 32 through slot 72.

A pair of belleville springs 74 and 76 surround stem 34 and are disposed between shoulder portion 78 on the cap 24 and the upper surface 80 of the conical member 30. These belleville springs preferably are positioned with their concave sides facing each other and are effective to prevent the conical member 30 from sticking in the cap member 24 after the molding operation has been completed.

The upper end of stem 34 extends through central opening 64 and is held against downward movement by a snap ring 79 resting on the upper surface of shoulder 78. A central longitudinal opening 82 in the stem permits the insertion of a thermometer.

The handles 26 and 28 preferably made of a plastic heat insulator material are pivotally mounted on lugs 40 and 42 respectively. For purposes of inserting the closure assembly in place or removing it after molding, the handles are folded downwardly to a substantially horizontal position as shown in dashed lines in FIG. 1. It will be observed that the lugs 40 and 42 are positioned radially inwardly of the outer cylindrical surface 84 extended of the mold cylinder and further that the handles 26 and 28 in their upwardly folded position, as seen in FIG. 2, also are positioned radially inwardly of the outer cylindrical surface 84 extended. This is important because it permits a cylindrical temperature control unit such as a heater 86 or a cooler (not shown) to be slipped downwardly over the mold cylinder to closely surround the latter simply by moving the handles to the upwardly folded position as shown in FIG. 2. Prior to this construction, a removable handle was used to apply the necessary force to lock the closure assembly tightly in the mold cylinder. With the construction shown herein, of course, the handle does not need to be removed for any reason. Heater and cooler units may be successively put on and removed from the unit without any inconvenience or wasting of time.

Each of the handles are also formed with a radially projecting shoulder 88 which extends at least part way around the handle. Since the metal cap member may become very hot during the molding process, this shoulder provides a stop or guard to prevent, or, at least, deter, the operator's hand from coming too close to the metal cap and getting burned.

Prior to a molding operation being performed, the closure assembly, of course, is out of the mold cylinder. The specimen to be mounted is placed on the lower piston 20 and resin is poured into the mold cylinder. Then the closure assembly is tightly screwed into the upper end of the mold cylinder by use of the folded down handles 26 and 28. Then the lower compression member or piston 20 is raised under hydraulic pressure, for example, as indicated by the arrow by manipulation of the handle H of the mounting press P to compact the resin 22 between piston 20 and upper compression member 32. This is effective to slightly raise the member 32 resulting in the compression of spring 36 and the urging of the conical spreader member 30 into contact with the segments 58 of the skirt of the cap member 24 causing the segments 58 to expand slightly into tight threaded engagement with the mating threads formed in the mold cylinder. At the appropriate stage during the molding process, a heater unit or cooler unit may be placed over the mold cylinder after first conveniently raising the handles 26 and 28 to a vertical position. During the molding operation, any gases formed in the mold cavity resulting from the melting of the resin may escape through the slots 56 and grooves 60 formed in the cap member 24. Upon completion of the molding operation, the handles are lowered to their horizontal position to unscrew the closure assembly from its locked position. The belleville springs 38 are effective to exert outward pressure on the conical member 30 to thereby effect a quick release of the conical member from the cap member.

While a preferred embodiment of the invention has been disclosed, it will be appreciated that this has been shown by way of example only, and the invention is not to be limited thereto as other variations will be apparent to those skilled in the art and the invention is to be given its fullest possible interpretation within the terms of the following claims.

We claim:

1. In a mounting press for mounting a specimen in a compression moldable mounting material, said mounting press including a compression mold device defining a mold cavity for receiving the specimen and moldable mounting material for mounting the specimen, a closure assembly comprising:
   a cap lockingly insertable in the top of the mold cavity;
   means defining a centrally disposed conical recess in the lower portion of said cap;
   a conical spreader member matingly fitting into said conical recess means;
   upper compression member for slidable disposition in the mold cavity;
   an elongated stem member extending through said conical member and said cap and anchored to said upper compression member;
   a first compression spring means surrounding said stem member and disposed between said upper compression member and said conical member for urging said conical member into engagement with said cap;
   second spring means disposed between said conical member and said cap for urging said conical member out of engagement with said conical recess means; and
   handle means connected to said cap, said handle means being movable to an operating position for use during insertion of the cap into or removal of the cap from the mold and movable to a nonoperating position to allow a temperature control unit to be attached to or removed from around the mold.

2. The closure assembly of claim 1 wherein said second spring means comprises belleville spring means surrounding said stem.

3. The closure assembly of claim 1 wherein said cap includes a sleeve portion on the outside of which are formed threads which are adapted to engage threads in the top of the mold, and said sleeve having a plurality of slots formed therein to split the sleeve into a plurality of more than two equal segments which are adapted to slightly spread apart in response to pressure in the mold acting on said conical member.

4. The closure assembly of claim 3 wherein said cap has a circumferentially extending shoulder and includes grooves formed on said shoulder and extending to the outer periphery thereof, said grooves being in communication with said slots in said cap to provide escape ports for gas formed in the mold cavity during a molding operation.

5. The closure assembly of claim 1 wherein said handle means includes a pair of elongated diametrically disposed handles each having one end thereof pivotally attached to said cap, said handles being pivotable between a substantially horizontal operating position for securing or loosening the closure assembly and a substantially non-operating vertical position to allow a heater or cooler unit to be attached to or removed from around the mold device.

6. The closure assembly of claim 1 including a pair of oppositely disposed lug means formed on the upper portion of said cap; and handle means pivotally attached to said lug means for securing or loosening the closure assembly.

7. The closure assembly of claim 6 including stop means formed on the inner end of said handle means to minimize the possibility of an operator burning his hand when grasping said handle means.

8. The closure assembly of claim 1 wherein said handle means is made of an insulating material.

* * * * *